United States Patent Office 3,123,569
Patented Mar. 3, 1964

3,123,569
ANIONIC BITUMINOUS EMULSIONS
Merton J. Borgfeldt, San Francisco, Calif., assignor to California Research Corporation, San Francisco, Calif., a corporation of Delaware
No Drawing. Filed Mar. 1, 1961, Ser. No. 92,477
2 Claims. (Cl. 252—311.5)

The present invention relates to the production of anionic bituminous emulsions. More specifically it relates to the production of oil-in-water type anionic bituminous emulsions with the aid of a particular emulsifying agent, the presence of which imparts improved adhesion of bituminous binder to stone aggregate which may contain as much as 20% by weight of fine and/or low-grade materials of less than 200 mesh size.

When using a bitumen, such as an asphalt, in slurry seal mixtures, the bituminous material is usually emulsified in water with conventional alkaline base emulsifiers, and the resulting emulsion is then mixed with sand which may contain a substantial proportion (up to 20% by weight) of fines.

Again in base stabilization work, when well graded gravel or crushed stone aggregate is not available, the bituminous emulsions prepared in conventional fashion are mixed with lower grade aggregates which may contain considerable proportion of non-cohesive sand or clay.

Another application of bituminous emulsions, where the emulsion is combined with finer aggregates, is that of preparing asphalt and the like floor mastics. Here the emulsified asphalt is being mixed with sand, coarse aggregate and Portland cement.

The dense-mixing grade (SS-type) bituminous emulsions, suitable for the preparation of the aforementioned mixes with densely graded aggregates, must stay stable on being mixed with fine materials, such as particles of Portland cement, fine sand, pit-run, crusher-run, and clay-bearing aggregates. Once applied to the surface to be treated, they should dehydrate rapidly and, in particular, should display satisfactory adhesion of the bituminous binder to the particles of the aggregate in the pavement base, seal cover, or floor surface which is being constructed or repaired.

However, anionic asphalt emulsions, i.e. those emulsions prepared by emulsifying asphalt in water with the aid of an alkaline base or a stable anion-active soap, and commonly employed for the preparation of dense mixing grade emulsions, do not necessarily and always satisfy the desiderata of their manufacturers and users.

Almost invariably the use of anion-active emulsifiers and, in particular, of conventional alkali metal emulsifying bases (hydroxides) for emulsifying asphalts of California and Venezuela origin results in poor adhesion of the asphalt binder to stone aggregate, when the emulsions, instead of being applied immediately, are stored, even though for only a few days.

In some states, where the specifications set up by authorities controlling road construction and repair require that the emulsion be subjected to a heat stability test by being stored hot (for instance, at 150–160° F.) for several days prior to being submitted to an adhesion test, anionic asphalt emulsions prepared with conventional soap emulsifiers or alkali metal emulsifying bases more than often fail to pass either of the tests.

Addition to these anionic asphalt emulsions of certain salts, such as lead naphthenate, ferric chloride, and sodium or potassium dichromates, known in the art as "antistripping" or "adhesion" agents, likewise does not always solve the problem. Lead naphthenate, being insoluble in water, cannot be effectively used in oil-in-water type emulsions. Ferric chloride, although water-soluble, tends to break the emulsion at least partially. Dichromates, although relatively effective at first lose their adhesion-boosting properties with time, and particularly, when the emulsions are stored at elevated temperatures.

I have found that anionic bituminous emulsions capable of producing satisfactory, mechanically stable mixes with stone aggregates containing up to 20% by weight of such materials as fine sand, sand silt, and/or fine, low-grade components such as pit-run and crusher-run fines and clay, etc. may be effectively prepared by employing as the emulsifying agent for asphalt or an equivalent bituminous binder, certain amine-type materials derived from lignin. These lignin-derived materials, which will be described hereinafter, act as effective anionic emulsifying agents for dispersing bitumens, such as asphalts, in water, provided that the pH of the final emulsion lie in the range from about 9.5 to about 10.5. The anionic emulsions so prepared can be readily combined with the aggregates containing up to 20% by weight of low-grade finer material, with sand, or with cement, in order to form mixes suitable for pavement-base stabilization, slurry seal coatings, and floor mastics, and display excellent adhesion of the bituminous (asphalt) binder to the aggregate despite the presence therein of considerable amounts of lower grade, finer mineral components.

The particular amine materials of the invention, designated hereinafter as "lignin amines," are produced in any suitable known manner, for instance, by the so-called Mannich reaction, in accordance with the procedure described in U.S. Patent 2,863,780, issued December 9, 1958, to John Corning Ball, Jr. In this reaction, lignin is reacted with a primary or a secondary amine and formaldehyde, although other aldehydes and equivalent ketones may be also employed, for instance, acrylaldehyde, benzaldehyde, acetaldehyde, etc., as well as acetone, isophorone, and the like.

Lignin for the production of the lignin amines may be derived from any available source of supply, such as wood, bagasse, straw, corn cobs, bark, etc., from which it can be extracted by known methods such as pulping of the wood, the sulfate method, the soda method, acid hydrolysis, and solvent extraction. Sulfonated lignin may be also employed for the same reaction with the amine or ketone.

Any suitable primary or secondary amines can be used to make the lignin amine, for instance, butylamine, dimethylamine, morpholine, etc.

The lignin amine material resulting from the reaction with the amine and the aldehyde is added to the water in solution is then adjusted on the alkaline side to a value which the asphalt will be emulsified, and the pH of the which would assure emulsification of the asphalt by the resulting alkali metal salt of lignin amine and would provide the desired pH value from about 9.5 to about 10.5 in the resulting finished emulsion. Otherwise, the emulsion is formed in the conventional manner, agitating the combined two phases (water and asphalt) in a suitable piece of equipment, such as a colloid mill.

In the resulting emulsions with the pH in the range of from about 9.5 to about 10.5, the content of asphalt may range from about 30 to about 75% by weight, the concentration of the lignin amine emulsifier ranging from about 0.2 to about 2.0% by weight, and water making up the balance of the emulsion to 100% by weight. Particularly satisfactory are those emulsions which are characterized by an asphalt content of from about 55 to about 65% by weight. Practically any asphalt with penetration values from about 40 to about 300 may be emulsified with the aid of the lignin amine emulsifier of the present invention.

Although, in general, addition of from about 0.2 to about 2.0% by weight of lignin amine as an alkali metal salt, will suffice to effect the emulsification and to impart to the emulsion a pH from about 9.5 to about 10.5, addition of a small quantity of a suitable emulsifying base, such as potassium hydroxide, may occasionally be desired to attain the particular optimum pH value. Furthermore, an auxiliary non-ionic emulsifying agent, for instance, an ethylene glycol polyether, may be added in small amounts (in the range from 0.01 to about 2.0% by weight) to facilitate the pumping of the bituminous emulsions of the present invention.

If desired and wanted under the circumstances, other known conventional additives may be employed in small amounts which do not affect the emulsification adversely, and will not impair the properties of the emulsion improved in accordance with the invention. Once the emulsion has been prepared, it may be either stored until required and transported to the job where it will be combined with cement, sand, or other aggregates; or it may be mixed with the kind of aggregate required for the intended application at a central plant in a large pug-mill or cement-mixer, and the mix will then be taken to the job side immediately and mixed there with the aggregate in the available motorized mixing equipment, or even manually in the absence of such equipment.

Numerous tests have been carried out to confirm the improvement in adhesion and other desirable characterisitcs of anionic bituminous emulsions prepared in accordance with the present invention.

In a modification of the ASTM D-244 cement test, 50 g. of cement sifted through an 80 mesh sieve was placed into a 500 ml. porcelain cup. A portion of an asphalt emulsion, prepared in accordance with the invention and diluted to 55% asphalt residue, was placed into a 100 ml. graduate. This latter was then filled to the 100 ml. mark with water, and the contents were stirred. The resulting diluted emulsion was poured over the cement in the cup, and the mixture stirred for one minute at 60 r.p.m., the temperature being kept between 70 and 80° F. Distilled water (150 ml.) was added to the emulsion, and the mixture stirred for 3 minutes, whereupon it was poured over a previously weighed 14 mesh sieve. The porcelain cup was rinsed with distilled water, and the rinsing repeated by pouring the rinsings through the sieve until the materials drained no longer were colored. A can lid of sufficient size to hold the sieve was weighed, and this latter and its contents were placed on the can lid and dehydrated at low temperature on a hot plate. Upon cooling, the lid and the sieve were weighed. The cement test residue (R) was determined by subtracting from the combined weights of the lid and the sieve after dehydration ($W_R$), the sum of the tared weights of the sieve ($W_S$) and of the lid ($W_L$). The value of (R) which exceeded 3 g. was considered as not satisfactory.

In a modification of the ASTM D-244 sieve test, 1 kg. of emulsion was poured through weighed sieves of different mesh sizes, moistened with a 2% solution of sodium oleate. After being dried for two hours at 220° F., the sieve was re-weighed, and the percentage of the solid matter retained was determined, the results indicating the average particle size of the solid phase (fineness) of the emulsion.

In a specially designed adhesion test, 100 g. of an aggregate passing through a ⅜" screen and retained on No. 10 sieve was washed with distilled water and air-dried. Then 8 g. of the emulsion heated to 120° F. was added to the aggregate at room temperature and thoroughly mixed therewith. The mixture was placed for 24 hours in an oven at 200° F. After this, the sample was re-mixed until each stone was observed to be thoroughly coated. One half of the coated mixture was placed in a 600 ml. beaker containing 400 ml. of boiling distilled water, stirring vigorously for one minute at 60 r.p.m. When the boiling was stopped, the asphalt floating on the surface of the liquid was skimmed off, using absorbent paper. The sample of the aggregate was removed with a spoon, and placed on absorbent paper to be air-dried. When it became dry, the percentage of adhesion was estimated visually by comparison with the other half of the originally coated aggregate sample.

A typical emulsion sample prepared with the aid of the lignin amine emulsifier of the invention contained 58% by weight of a 50–60 penetration California asphalt (acid value about 0.8), 1% by weight of lignin amine, the balance to 100% by weight being water. The pH of the emulsifying water containing the dissolved lignin amine was 9.9. The emulsion had a smooth, non-grainy, fine texture, displaying no settlement and no lumps of the solid phase. The cement test results showed practically no residue. The sieve test results were as follows: on a 20 mesh screen, 0.9% by weight was retained; on a 40 mesh screen, 0.01% by weight was retained; on an 80 mesh screen, 0.05% by weight was retained. The adhesion test results clearly pointed to the superior adhesion of asphalt to the aggregate; it was 100% both on silica and on limestone.

Another typical emulsion sample contained about 60% by weight of a Venezuelan asphalt with penetration values of the order of 200 to 300, and acid values of about 1.0. The emulsifier was a mixture of 0.7% by weight of lignin amine (as sodium salt), as the primary emulsifier, about 0.2% by weight of potassium hydroxide, and 0.1% by weight of a non-ionic ethylene glycol polyether salt under the trade-marked designation of "Igepal DJ–970," the balance of the emulsion to 100% by weight being water. The emulsion exhibited a fine texture, lacking in settlement. The results of the cement, sieve and adhesion tests again disclosed excellent adhesion and heat stability, and a satisfactory mixing stability on being mixed with stone aggregates containing finer and low-grade components.

In employing still another sample of a similar emulsion, the pH of which, however, lay outside the operative 9.5–10.5 range, namely, at a value equal to about 11.0 the results of the adhesion test were not as satisfactory, indicating the criticality of the aforementioned pH range.

Thus, the invention in proposing to employ the lignin amine as the emulsifier for anionic bituminous (asphalt) emulsions characterized by a pH of from about 9.5 to about 10.5, enables satisfactory formulation of particular paving mixes with either siliceous or limestone aggregates which may contain as high as 20% by weight of finer aggregates of less than 200 mesh size. The previously observed handicap of insufficient adhesion of the bituminous binders to such aggregates is eliminated in these emulsions, and firmly sealed paving structures are made feasible. This constitutes a definite and valuable advance in the art of bituminous slurry seal coatings, in the stabilization treatment of paving bases, and in the manufacture of floor mastics.

I claim:

1. An oil-in-water type anionic bituminous emulsion with improved adhesion property, comprising from about 30 to about 75% by weight of bitumen, as the dispersed phase, from about 0.2 to about 2.0% by weight of a water-soluble alkali metal salt of lignin amine product of reaction of lignin with an amine selected from the group of primary and secondary amines and with a carbonylic compound selected from the group of aldehydes and ketones, as the anion-active emulsifier, and water in an amount to make up 100% by weight, as the continuous phase, the pH of the emulsion being adjusted to a value from about 9.5 to about 10.5.

2. An oil-in-water type anionic bituminous emulsion as defined in claim 1 wherein said bitumen is asphalt in an amount from about 55 to about 65% by weight.

References Cited in the file of this patent

UNITED STATES PATENTS

| | | |
|---|---|---|
| 2,615,851 | Manzer | Oct. 28, 1952 |
| 2,709,696 | Wiest et al. | May 31, 1956 |
| 2,863,780 | Ball | Dec. 9, 1958 |

OTHER REFERENCES

The Chemistry of Fatty Amines, publ. by Armour and Co., 1948, pp. 17 and 18.